United States Patent
Gruda et al.

(10) Patent No.: US 9,418,321 B1
(45) Date of Patent: Aug. 16, 2016

(54) TAGGING OF TISSUE CARRIERS WITH LIGHT-ACTIVATED MICROTRANSPONDERS

(75) Inventors: Maryann Gruda, Yardley, PA (US); Wlodek Mandecki, Princeton, NJ (US); Ziye Qian, Monroe Township, NJ (US)

(73) Assignee: Pharmaseq, Inc., Monmouth Junction, NJ (US)

( * ) Notice: Subject to any disclaimer, the term of this patent is extended or adjusted under 35 U.S.C. 154(b) by 277 days.

(21) Appl. No.: 13/239,801

(22) Filed: Sep. 22, 2011

Related U.S. Application Data (60) Provisional application No. 61/386,188, filed on Sep. 24, 2010.

(51) Int. Cl.
*G06K 15/00* (2006.01)

(52) U.S. Cl.
CPC ...................... *G06K 15/00* (2013.01)

(58) Field of Classification Search
USPC .......................................................... 235/383
See application file for complete search history.

(56) References Cited

U.S. PATENT DOCUMENTS

| | | | | |
|---|---|---|---|---|
| 7,663,487 B2 * | 2/2010 | Morris | ............... | G06K 7/10366 340/572.1 |
| 8,608,080 B2 * | 12/2013 | Finn | .................... | B32B 37/1207 235/487 |
| 2002/0064482 A1 * | 5/2002 | Tisone | ................. | B01J 19/0046 422/400 |
| 2005/0150740 A1 * | 7/2005 | Finkenzeller | .......... | B42D 25/29 194/207 |
| 2005/0157304 A1 * | 7/2005 | Xiao | .................... | G01N 21/253 356/446 |
| 2009/0225415 A1 * | 9/2009 | Hughes | ................... | B01L 3/545 359/396 |
| 2011/0201106 A1 * | 8/2011 | Sohn | ....................... | G01N 1/36 435/325 |

OTHER PUBLICATIONS

PharmaSeq, Illustration of a microtransponder for DNA-probe assays, Feb. 5, 2001, http://web.archive.org/web/20010205050700/http://pharmaseq.com/illustration.html.*
Collins, Jonathan, Putting Tags on Test Tubes, RFID Journal Live! Europe, asserting a date of Apr. 29, 2004, Dexter House, London, England, Downloaded from www.rfidjournal.com/articles/view?922 (blow-up of test tube image attached as second page).
U.S. Response to Non-Final Office Action filed Sep. 9, 2013 for U.S. Appl. No. 13/239,779.
U.S. Appl. No. 13/870,357, filed Apr. 25, 2013, 21 pages.
Response to Office Action filed on Sep. 8, 2015 for U.S. Appl. No. 13/870,357, 10 pages.

* cited by examiner

*Primary Examiner* — Michael G Lee
*Assistant Examiner* — David Tardif
(74) *Attorney, Agent, or Firm* — Moser Taboada (57) ABSTRACT

Provided herein, among other things, is an assembly consisting of a tissue cassette or slide and an affixed transponder.

15 Claims, 8 Drawing Sheets

TAGGING OF TISSUE CARRIERS WITH LIGHT-ACTIVATED MICROTRANSPONDERS

This application claims the priority of Ser. No. 61/386,188, filed Sep. 24, 2010, which is incorporated by reference herein.

Embodiments of the present invention generally relate to tissue carriers, such as tissue cassettes and glass slides, physically associated with light-activated microtransponders, and methods of making and using the same.

As described in U.S. Pat. No. 7,098,394, very small, light-activated microtransponders (MTPs) are available to provide identifiers, for example as identifiers used in conjunction in nucleic acid assays. These have proven to be stable under a number of challenging conditions.

Radio frequency identification devices have been in use for some time, including for object tagging. Systems are available for example from Avid Technology, Inc. (Tewksbury, Mass.), Lutronic International (Rodange, Luxembourg) and Bio Medic Data Systems, Inc. (Seaford, Del.). In animal use, these systems are encapsulated, such as in biocompatible glass. Given the encapsulation, and the need for antennae, the smallest of these devices is believed to be just less than 0.84 mm by about 3 or 4 mm. As the transponder trigger is radio waves, typically there is no substantial issue with the orientation of the transponder once injected.

SUMMARY

Embodiments of the present invention generally relate to tissue carriers, such as tissue cassettes and glass slides, with light-activated microtransponders.

Provided, among other things, is a tissue carrier with an affixed light-activated microtransponder.

Provided among other things is an assembly consisting of a tissue cassette and an affixed transponder. The transponder can be, for example, a MTP. The transponder can be, for example, embedded in the framework of the tissue cassette. The transponder can be, for example, glued to the surface of the tissue cassette. The transponder can be, for example, covered with a transparent or semi-transparent material.

Further provided is a method of use of the assembly wherein: (a) the assembly is physically linked to a tissue sample by placing the sample in the cassette; (b) The ID of the transponder is read. The method can be where the tissue in the cassette is processed to dry the tissue and then with a clearing agent prior to the ID being read. The method can be conducted where the cassette is at a temperature of −20° C. or less (−30° C. or less, 40° C. or less, −50° C. or less, −60° C. or less, −70° C. or less) when it is read.

Also provided is a MTP-reader apparatus comprising a form adapted to direct an cassette with affixed MTP to be positioned for excitation by a laser of the MTP-reader and reading by an RF coil of the MTP-reader. The MTP-reader apparatus can be such that the laser and coil are in a wand that can be removed from the MTP-reader apparatus for use in reading MTPs without the aid of the form, and wherein the MTP-reader apparatus is adapted to reliably position the wand for use in the MTP-reader apparatus.

Further provided is an assembly comprising a glass slide and an affixed transponder. The transponder can be, for example, a MTP. The transponder can be, for example, affixed on the side of the glass slide. The transponder can be, for example, such that the plane in which the transponder resides is approximately perpendicular to the plane of the glass slide. The transponder can be, for example, glued to the glass slide. The transponder can be, for example, covered with a transparent or semi-transparent material.

Also provided is a method of use of the assembly according to which: (a) the assembly is physically linked to a sample by placing the sample on the glass slide and covering it with the cover slip or other protective material or substance; and (b) The ID of the transponder is read by directing at it the radiation emitted by a electronic reader capable of processing the signal sent by the transponder. The method can be such that multiple slides are read, with the transponders MTPs placed on edges of the slides, and with the IDs read by (a) progressing a reader along the edges of a progression of slides or (b) by reading multiple IDs with a multiplexing reader.

Further provided is a MTP-reader apparatus comprising a form adapted to direct an slide with affixed MTP to be positioned for excitation by a laser of the MTP-reader and reading by an RF coil of the MTP-reader. The MTP-reader apparatus can be such that the laser and coil are in a wand that can be removed from the MTP-reader apparatus for use in reading MTPs without the aid of the form, and wherein the MTP-reader apparatus is adapted to reliably position the wand for use in the MTP-reader apparatus.

Additionally provided is a method of affixing a MTP onto a slide comprising forming a cavity on a side edge of the slide and affixing therein a MTP such that it can be read with laser light directed from the side of the side.

Where this specification describes methods of reading the affixed MTPs or methods of affixing the MTPs, such methods are within the invention. Where this specification describes devices for reading the MTPs as affixed to the tissue carrier, such devices are within the invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

The reading face of an exemplary MTP (defined below) is shown schematically in FIG. 1. The MTP has photocells 1, antenna 2, logic circuits 3, and memory circuits 4.

A wand device for reading an MTP is illustrated in FIG. 2, with a U.S. quarter superimposed for scale.

The electronic features of a wand device for reading an MTP are shown in FIG. 3.

Tissue carriers are shown in FIG. 4, and include the cassette (Panel A) and glass slide (Panel B). Locations of MTPs are shown with arrows.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Figure 1:
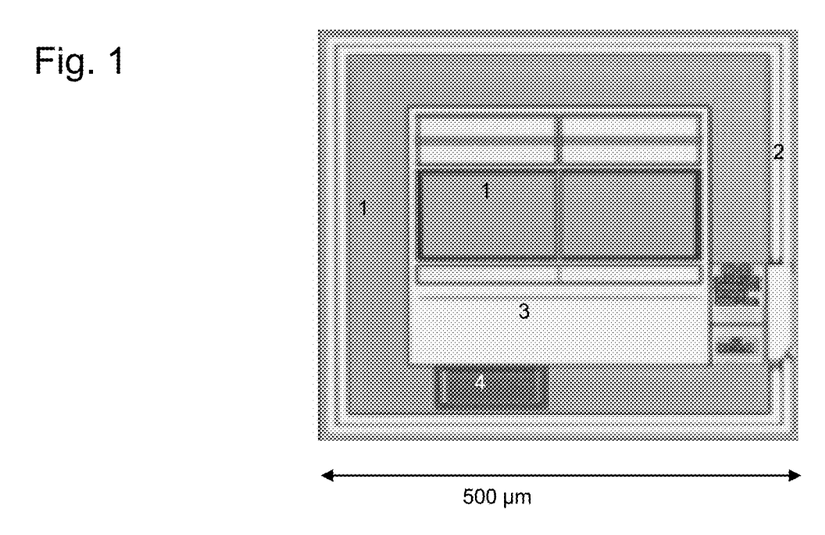

The invention is a new type of RFID tagged devices for rapid identification of tissue cassettes and slides used and stored in histopathology laboratories. These devices are termed "MTPs." The devices are based on a laser light-powered microtransponder (FIG. 1) whose major advantages are small size, monolithic (one part) design, inertness (silica-based), robustness and very low cost. The devices consist of cassettes or slides tagged with the MTP and an ID reader. The system can be used in histopathology laboratories. However, the system has the potential to greatly widen the use of RFID tags in a variety of research and clinical laboratories, or even lead to the general adoption of this technology as a universal tagging system that can track a tissue carrier from one-time use in the laboratory to prolonged storage under essentially all conditions possible.

Over 8 million pathology specimens are collected annually for diagnostic or therapeutic reasons at Graduate Medical Education Teaching Institutions alone [1]. After diagnosis, with appropriate consent, many of these samples are saved or used for research purposes. The more than 100 million tissue specimens currently stored in large tissue banks and repositories in the United States represent a valuable asset archive for both patient care and research initiatives [1, 2]. The analysis of formalin-fixed paraffin-embedded tissues (FFPE) is increasingly recognized as a strategy for the discovery and validation of clinically useful biomarker candidates further increasing the potential value of these samples. Almost all of these samples could benefit from the application of MTP technology. The extremely small size of the MTP allows consideration of applications to a wide variety of storage devices. Implementation of RFID technology across vast sample numbers will lower costs and stimulate further adoption.

The Clinical Laboratory Improvement Amendments of 1988 (CLIA) stipulates that in order to be accredited, laboratories must retain paraffin tissue blocks for a minimum of two years and histopatahology slides for at least 10 years from the date of examination [3]. Some states impose further regulations requiring pathology specimens to be retained for 20 years [1]. Such requirements mandate a highly reliable and preferably electronic system with the large number of samples that must be retained. Barcodes have been introduced as an electronic method for tagging slides and cassettes. One-dimensional and two-dimensional barcodes may be printed either directly on, or on a label that is applied to the slide or cassette. The adhesives used in labels can fail in the solvents used for processing tissues, particularly xylene, causing some companies such as Brady (Milwaukee, Wis.) to implement a dual adhesive/mechanical embedding system to ensure label attachment for cassettes. Direct printing systems are available from Thermo Scientific (Waltham, Mass.) and General Data Company (Cincinnati, Ohio). Considerable advancements have been made in the printing methods to minimize solvent damage. Preparing the labeled slides and cassettes appears straightforward, yet is often fraught with problems from markers clogging, drying out or inks smearing before dry. Such systems typically cost $15,000 to well over $50,000, putting them out of reach of many facilities.

RFID technology has made significant inroads into healthcare to improve the identification and traceability of a variety of medical items. Several manufacturers, such as TAGSYS RFID (Cambridge, Mass.) and Magellan Technology (Stafford, UK) offer large adhesive RFID label systems [4, 5] with desktop readers and a special adhesive labels containing an embedded RFID device are attached to the exterior of sample containers. While these methods have found applications in tagging cryovials, blood bags, and other such items, advancement in histopathology applications has been slow due to the larger size of the tags, their high cost, and their inability to withstand harsh processing chemicals. In contrast, slides and cassettes can be readily tagged with MTPs due to their chemical stability and extremely small size, as the dimensions of both the chip and the thickness of a typical glass microscope slide (1.2 mm) or a cassette wall (average of 0.91 mm) are compatible.

The System

The system for pathology slides and cassettes includes a line of cassettes with MTPs embedded into polymer (e.g., polystyrene, polypropylene or acetal polymer) bodies and a line of glass slides with permanently mounted MTPs, thus assuring absolute connectivity of the tag with the container. The ID can be registered at the time the specimen is placed in the cassette linking it to the electronic sample record. The MTPs can be mounted on the side of slides so that slides can be identified while stored within storage drawers. A useful location for embedding the chips on the cassettes is the front or the sides. Additional identification means are possible, but not necessary. For instance, the MTP can coexist with a barcode, or a hand written label, which some users may prefer. Dual MTP tags and hand or printed labels can also be used.

The system can include an ID reader, such as a benchtop ID reader about the size of a stapler. A form factor can be used to direct the alignment of the slides and cassettes for reading. Although cassettes can vary considerably in depth, most utilize a common form so that one reader configuration should be able to read all or most cassettes with appropriately positioned MTPs. The reader is connected to a computer by wire, such as via a USB2 interface, or through a wireless connection, e.g. Bluetooth, Wi-Fi or protocols used in wireless cell phone communication, or the like.

Advantages

An advantage is the positive identification and tracking of tissue specimens and the maximization of the accuracy and utility of tissue specimens. This is accomplished as a result of the improved traceability of each sample with its correct identification and annotation, and minimizing misidentification as a result of missing or damages labels. Innovation is focused on novel technological solutions. Another advantage of the system is the increased speed with which a worker can cull though a collection to find a specific slide or cassette.

Novel Concept: Slides and Cassettes Tagged with Ultra-Small Light-Powered RFID Chips.

The invention allows the permanent placement of an RFID tag into the wall of the tissue cassette or edge of a glass slide. Using a traditional RFID tag for these purposes in most, if not all cases, is practically impossible or too costly due to its large size. Embedding has significant implications with respect to the system's performance, as it makes the MTP virtually resistant to destruction or degradation by handling or from exposure to harsh chemical solvents.

Viable Alternative to Barcode.

While the shortcomings of hand labeling are well understood, hand labels have not been displaced in any significant way since alternatives, such as barcoding, traditional RFID tagging, etching or printing, while eliminating certain deficiencies, introduce other issues. The MTP tagging system, because of attractive properties of the MTP (ultra-small size, ruggedness, activation by light, low cost), is in an excellent position to provide a significant alternative, or even partially displace other tagging methods.

Methods to Embed MTPs into Cassettes.

Several innovative fabrication methods are described herein, including a method to semi-automate the embedding of chips into the wall of the cassette and then, if necessary, covering the chip with polypropylene or another patching compound/polymer. Also, the MTP can be embedded into molten plastic (e.g., polypropylene) during manufacture of cassettes.

Superior Tissue Sample Preservation.

Both basic and translational research programs rely heavily on sufficient availability of high quality, well-annotated biospecimens [11]. Preserving sample quality is the key factor [12] and numerous criteria regarding physical and biological characteristics of the tissue samples, as well as their handling and storage conditions, have been established [11]. Yet positive identification of clinically annotated tissues throughout the various handling stages is challenging due to the extreme temperature and chemical conditions required. Inks and adhesive labels are often unreliable in the solvents used to prepare FFPE tumor and normal tissue samples. In addition, the ability to obtain sample identification without warming snap-frozen (–86° C. or colder) samples prepared for cryosectioning increases the quality of the sample and extends its useful lifetime. The use of MTP tagged slides and tissue cassettes will directly advance tissue sample preservation by dramatically improving the reliability of sample tracking post-acquisition throughout handling/processing, storage, distribution, analysis and redistribution stages.

As described in U.S. Pat. No. 7,098,394, very small, light-triggered transponders ("MTPs" or "p-Chips") are available to provide identifiers, for example as identifiers used in conjunction in nucleic acid assays (e.g., assays using DNA, RNA, or analogs thereof). These have proven to be stable under physiological conditions. Such devices have also provided a substrate on which new approaches for using metal particles have now been explored.

These MTPs are generally sided, in that the photocell/RF circuitry is formed on one face, and the other major face is generally silicon—and can be a product of height reduction by back grinding. The circuitry face is generally protected by a passivation layer, such as of silicon dioxide, silicon nitride or mixtures, or multiple such layers.

A MTP has a length, width and height. A planar MTP is one where the height is 50% or less than the smallest of the length or width. In some embodiments, the height is 40% or less, 35% or less, 30% or less, 25% or less, or 20% or less, than the smallest of the length or width. MTPs used in the invention are often, but not necessarily, square or rectangular, consistent with a focus on low cost of production. A MTP is one where the longest of the length or width is 1.2 mm or less. In some embodiment, the longest of the length or width is 1.1 mm or less, 1.0 mm or less, 0.9 mm or less, 0.8 mm or less, 0.7 mm or less, or 0.6 mm or less. or 0.5 mm or less, or 0.4 mm or less, or 0.3 mm or less, or 0.25 mm or less, or 0.2 mm or less, or 0.15 mm or less. In one embodiment, the microchip is 600 micron×600 micron×100 or 120 micron.

Tissue Carriers—Object Definition

Figure 4:
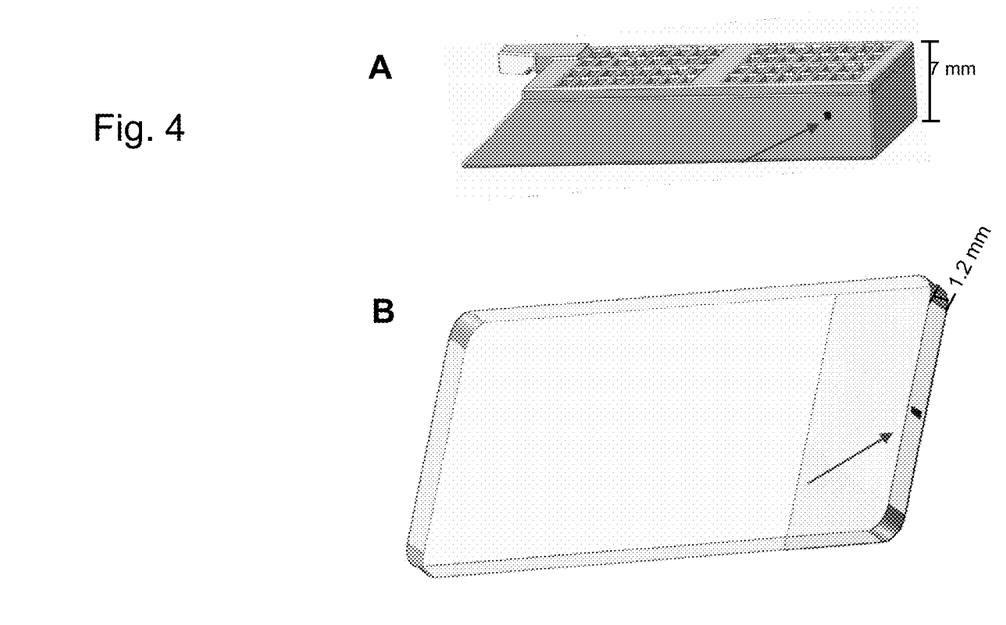
Figure 5:
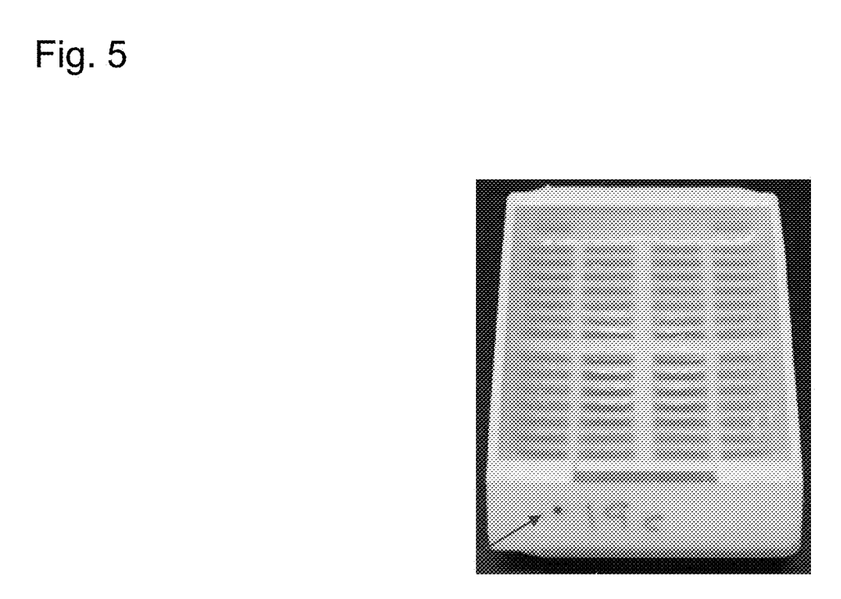
FIG. 5 shows a processed tissue cassette with an embedded MTP (arrow).

A tissue carrier is a device for processing and storage of small tissue samples, for instance, the samples obtained in histopathology laboratories. Two main types of tissue carriers are the subject of the invention, tissue cassettes and glass slides. An example of a tissue cassette is shown in FIG. 4A and FIG. 5, and an example of the histology glass slide, in FIG. 4B.

Sample Processing in Histopathology Laboratory (Source: Wikipedia, http://en.wikipedia.org/wiki/Histopathology#Collection_of_tissues)([annotated]:

The tissue is prepared using histology procedures for viewing under a microscope, [typically] using one of two method of fixation— chemical fixation or frozen section.

In chemical fixation, the samples are transferred to a tissue cassette, a container designed to allow reagents to freely act on the tissue inside. This cassette is [typically] immersed in multiple baths of progressively more concentrated ethanol, to dehydrate the tissue, followed by toluene or xylene, and finally extremely hot liquid (usually paraffin). During this 12 to 16 hour process, paraffin will replace the water in the tissue, turning soft, moist tissues into a sample miscible with paraffin, a type of wax. This process is known as tissue processing.

The processed tissue is then taken out of the cassette and set in a mold. Through this process of embedding, additional paraffin is added to create a paraffin block which is attached to the outside of the cassette.

The process of embedding then allows the sectioning of tissues into very thin (2-7 micrometer) sections using a microtome. The microtome slices the tissue ready for microscopic examination. The slices are thinner than the average cell, and are [typically] layered on a glass slide for staining. The second method of histology processing is called frozen section processing. In this method, the tissue is frozen and sliced thinly using a microtome mounted in a refrigeration device called the cryostat. The thin frozen sections are [typically] mounted on a glass slide, dried, and stained using the same staining techniques as traditional wax embedded sections. The advantages of this method is rapid processing time, less equipment requirement, and less need for ventilation in the laboratory. The disadvantage is the poor quality of the final slide. It is used less in diagnostic pathology, but more in determining margin of a tumor during surgery.

The present invention provides a new type (microtransponder-tagged) of tissue cassettes and glass slides for the histopathology laboratory.

Method to Mount MTPs on Cassettes

Cassette Design

A tissue cassette is modified by embedding a MTP in it. An example of suitable cassette is the Unisette tissue cassette (MarketLab, #ML7018) (FIG. 5). Possible placements of the chip in the cassette are highlighted in FIG. 4A and FIG. 5. Positioning the chip on the side of the cassette allows the ID to be read with a quick slide through the reader pocket (FIG. 7), but it is possible that users may prefer having the chips mounted on a different face, such as the top face, of the cassette. At 100 μm, the MTP thickness is compatible with the typical 0.91 mm wall thickness at the front and sides of a common cassette (Simport) so that the embedding procedure does not significantly weaken the wall.

Thermal Mounting of MTPs on Cassettes

First, the MTP is positioned on the cassette, then a modified soldering iron set to around 200° C. is placed on the face of the MTP to heat it up to the temperature above the melting point for the plastic (e.g., polypropylene, about 160° C.); as a result the MTP sinks into the plastic. This step takes about 2 seconds. After the MTP cools down to RT, polymer, such as molten biaxially oriented polypropylene (BOPP), is used to seal the cavity. Other filler polymers (including epoxy) will be apparent to those of skill in the art. Two methods have been identified for automating this process: 1) direct embedding of the chips while attached to an adhesive backing and 2) placement with a vacuum chuck and embedding, such as with a stream of hot air. An important step in the post processing of the silicon wafers used to make MTPs is the mechanical dicing in which the individual chips are cut. In order to do this, the thinned wafers are adhered to an adhesive film so that they remain in place while being diced. The chips can then remain on this film, either in sections or as a ribbon, permitting a straightforward alignment and embedding process where the chips are soldered into the cassettes while still adhered to the thin film. Alternatively, the MTPs can be placed on the cassettes with a pick-and-place robot and then thermally embedded.

Methods to Mount MTPs on Glass Slides

Glass slides used for histology are typically 2.5×7.6 cm (1×3 inch) with a thickness of 1.2 mm. With an overall width of, for example, less than 0.6 mm, the MTP can readily fit on the edge of the slide (FIG. 4B) where it does not interfere with the close stacking of slides in storage. The MTPs are permanently attached to the side of the slides using an appropriate adherent, such as: a clear acrylic adhesive, a high density polypropylene material similar to that used to seal MTPs into cassettes, an inorganic-organic hybrid glass material (17), a combination of these materials, or the like. Hybrid glass represents a unique combination of polymer and certain oxides like silica or silica-alumina and bonds covalently to most metals, silicon wafer, glass or plastic substrates. Robotic control can be used to accurately place MTPs on the slides, and to apply the adhesive or sealant material.

The MTPs can be mounted in a slot or hole formed by drilling, etching, cutting or the like. The MTPs can then be held in place with the adherents discussed above, which can also provide a protective covering.

The side mounted MTPs can be read in batch by an number of methods. For example, with the MTPs all presented to the side of a slide carrier, a wand can progress from one to the next rapidly. A form factor can be used into which the slides in their carrier are adapted to fit with the MTP ends of the slides presented to docking elements for the wand. The slots for the slides can be wider at their entry point, and ramp to a narrower fit that better positions the MTP for reading. The wand and the form factor can have complementary physical elements that assures that the wand correctly fits at the multiple locations for reading. Or, the form factor can interact with a electromechanical device for stepwise moving the wand from one reading location to the next. The slide tray can have a MTP for providing the tray with identifying information (via the unique number and a database). Or, the multiplexing designs for reading test tubes provided in U.S. Ser. No. 61/386,179, filed Sep. 24, 2010 can be adjusted to provide multiplex reading of the slides.

Simple Reader for Slides and Cassettes

Figure 2:
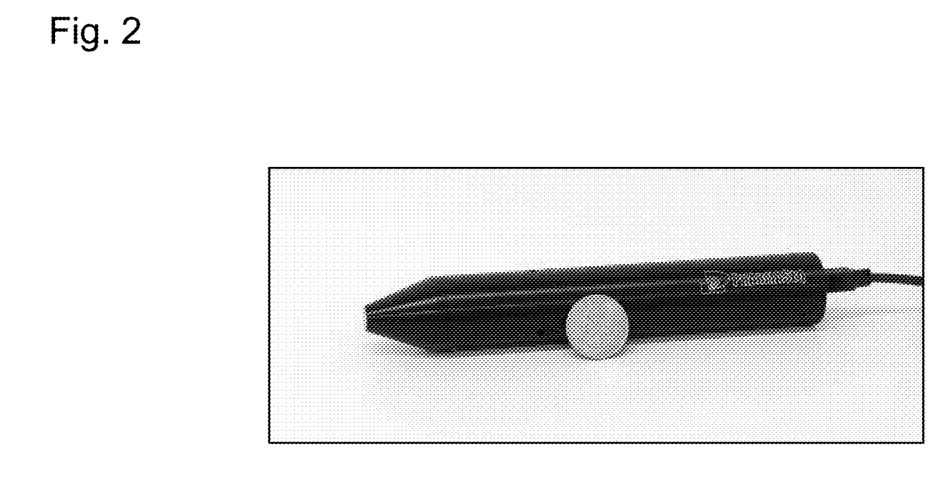
Figure 3:
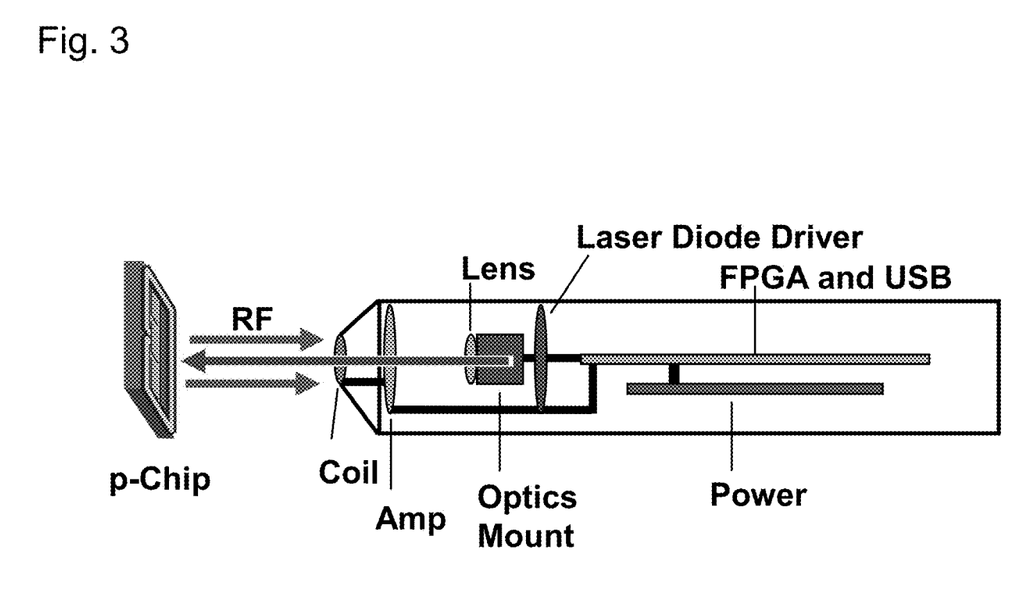

The illustrative ID reader (wand) of FIG. 2 is a hand-held device that can connect to a standard PC and capable of reading the serial number (ID) of individual MTPs. The wand can be, for example, USB-powered and contain a USB 2.0 transceiver microcontroller, a field programmable gate array (FPGA), power converters and regulators, a laser diode with programmable current driver, an optical collimation/focusing module, and a tuned air coil pickup with a high gain, low noise differential RF receiver with hysteretic comparator data slicer. The FPGA code in the ID reader can be upgraded to support incorporation of new features and performance enhancements. The wand contains a laser, for example emitting an average of 60 mW of optical power at 658 nm. The ID is read when the MTP is placed within suitable proximity of the laser light. The light can be, for example, pulsed at 1 MHz; this feature can provide the data clock used by the MTP for synchronization of the transmitted ID data bits. The timing of the pulse groups can be set so that the duty cycles and average power levels fall within requirements for registration as a Class 3R laser device.

The resulting ID readout from the MTP can be rapid (less than 0.01 sec) and can be reported on the PC using application-specific software. A performance parameter of the wand is its read volume; i.e., the space beyond its tip in which the ID can be read. This volume is a function of several variables, including illumination angle, illuminance energy, attenuation factors and tuning of the optical system's focal point. For example, it can be approximately 6 mm$^3$ (4 mm×1.5 mm×1 mm).

Conventional, passive RFID tags harvest power from the driving RF signal using antenna coils that are typically many centimeters in diameter. This setup results in up to approximately 1% efficiency of power transfer to the RFID device. In the case of those RFID methods that do not use such a large external antenna (such as the Hitachi mu-chip, now withdrawn from the market), the antenna efficiency drops by orders of magnitude, severely curtailing range and efficacy. Light energy harvested by photodiodes in the MTPs results in up to 10% efficiency in power transfer. Thus, because light-powered MTPs use energy more efficiently, they can achieve greater transmission ranges for the given small antenna size relative to pure RFID-based approaches. No other solution is smaller and more energy efficient.

It should be noted, however, that the invention can use any transponder affixed to a cassette or slide. A transponder such as the Hitachi mu-chip has advantages in this context that may not have applied to typical uses of transponders. Its small size is an advantage, as is its limited range, which can limit interference from neighboring transponders.

Further, the method of powering each MTP by a tightly focused laser beam allows specificity of physical addressing, i.e., addressing a dense array of tags in close proximity one tag at a time—an approach that is not feasible with conventional RFID methods. Using traditional RFID methods, multiple tags in close proximity will attempt to communicate simultaneously, mutually interfering with one another and preventing reading of the tags. This phenomenon is known as "RFID tag collision." An RF signal is only emitted from MTPs that are activated by the laser allowing precise positional specificity that can be applied to closely spaced, very small items.

MTP features enable a high level of security. While some RFID technologies enable additional information content, MTPs are conveniently made to contain only an ID number. All other information related to the sample container can be stored in a secure database. Thus, nothing about the sample can be determined from the physical sample container itself. In addition, the benefits of the small form factor of the MTP antenna limits transmission range to less than 1 cm, so that unintended transmissions are not likely.

Advanced Readers for Slides and Cassettes

The ID reader should register a cassette or slide ID automatically within 1 second when a MTP tagged specimen is placed within the guide slot.

Figure 6:
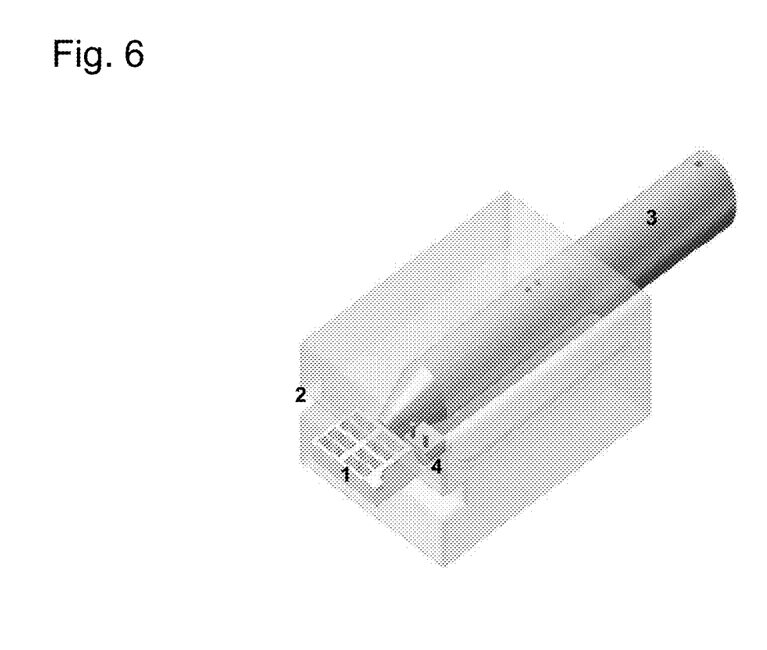
FIG. 6 provides a graphical representation of a design of the advanced ID reader for tissue cassettes. 1: cassette, 2: cassette pocket 3: wand 4: safety interlock switch.

A suitable form of the ID reader for cassettes is shown in FIG. 6. Incorporated is a removable wand placed within an interchangeable desktop form factor to position the slide or cassette for reading. In these designs, sliding or inserting the sample within the pocket can trigger an automatic safety interlock switch that activates the laser. The sliding movement improves the tolerance for the horizontal precision of placing a MTP on a slide or cassette.

Figure 7:
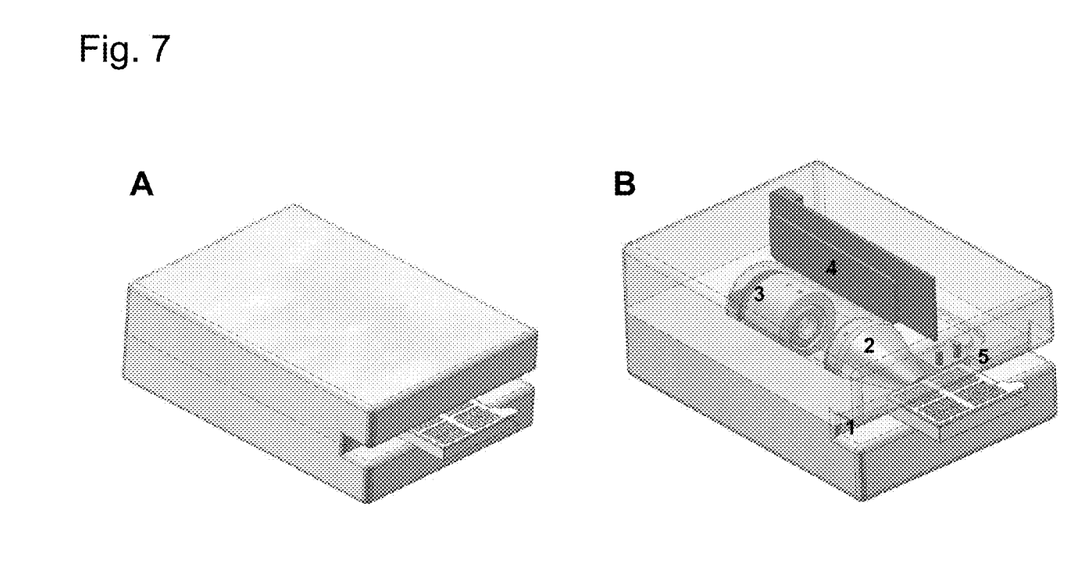
FIG. 7 shows a design of the compact-form cassette reader. Panel A: External and Panel B: cutaway view. 1: cassette pocket, 2: amplifier board, 3: laser, 4: FPGA, 5: safety interlock switch.

A compact form of the reader for tissue cassettes in which the wand parts are placed in a compact box (rather than in a separate round enclosure as in FIG. 6) has also been designed and is shown in FIG. 7.

Figure 8:
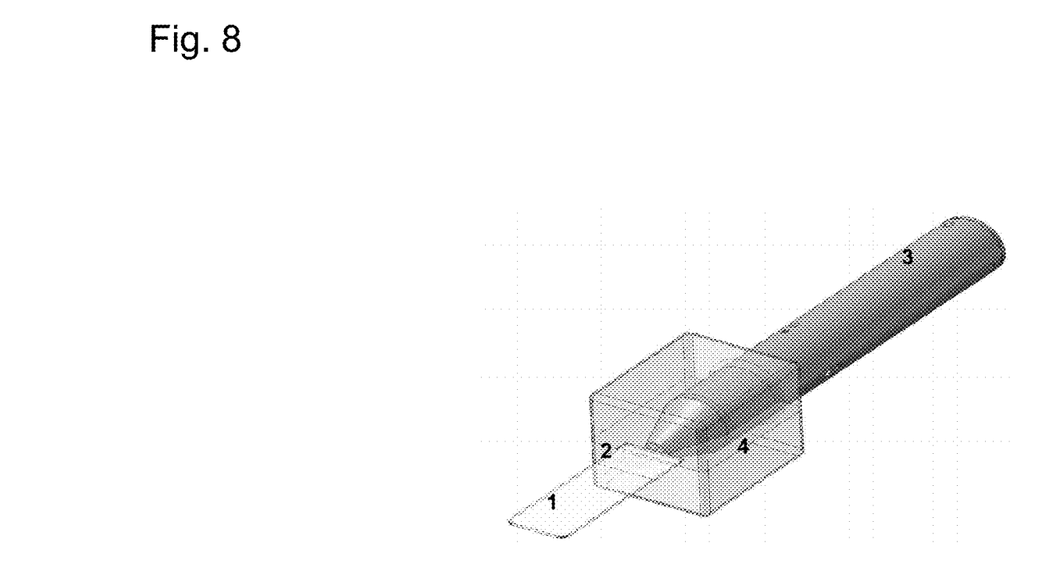
FIG. 8 shows a design of the ID reader for glass slides. 1: glass slide; 2: glass slide pocket; 3: wand, 4: form factor.

A suitable form of the ID reader for glass slides is shown in FIG. 8. The slide is inserted within a pocket to read the ID. In this design, the wand can be removed from the box so it can be used independently, such that stacks of slides or cassettes stored in drawers can be read without handling, aiding the rapid retrieval of desired samples. MTP placement can be on a side that is most accessible in a given slide storage system.

EXAMPLES

Example 1

Embedding of MTPs into Polypropylene Sheets and ID Readout

To test the feasibility of directly embedding MTPs into polymer materials, MTPs were applied to a polypropylene sheet. The chips were oriented in two ways: upward facing for unopposed transmission and facing toward the polypropylene to emulate transmissive degradation, such as might occur from partial covering of the chip with paraffin. The softening temperature point of polypropylene is about 160° C., so a soldering iron (model number: WSD80 manufactured by Weller) was used with the temperature set at 200° C. One hundred MTPs were thermally embedded facing up into a 1.56 mm thick polypropylene sheet and 23 MTPs were thermally embedded facing down. After embedding, all the MTPs could be read by the wand. The chips were also tested for tolerance to extreme temperature fluctuations by cycling them from −80° C. to room temperature daily for three weeks. Again, all the chips could be read.

Example 2

Readout of MTPs Kept at −78° C. (Dry Ice)

Cryosectioning is a commonly used method in immunohistochemistry. Thus, having a tag that functions while tissues are still frozen is advantageous. To find out if MTPs can be read while at an ultra-low temperature, 25 MTPs were placed on dry ice (−78° C.) and the RF signal emitted by chips evaluated. The ID reader itself was kept at RT. All of the chips could be read although the time required to read the chips was increased slightly. The reader initially needed to be recalibrated to adjust for a shift in the amplitude of the RF signal emitted from the frozen chips as compared to those at room temperature. Further optimization of the reader settings is fully expected to shorten read times expanding the potential MTP tagging application to include cryosections.

Example 3

Stability Testing of the Cassettes with MTPs in Different Solvents

Tissue slides and cassettes tagged with MTPs will be tested extensively for tolerance to the various solvents (xylene, chloroform, ethanol, methanol, etc.) following tissue processing protocols. The actual processing method used can vary considerably depending on the tissue, study goal and particular facility involved. However, tissues are typically fixed for 4-48 hours in 10% neutral buffered formalin, dehydrated through a series of solutions of increasing alcohol from 80-100% ethanol or isopropanol, cleared for 1-3 hours in xylene and then impregnated with paraffin [15]. Based on experience, the clearing agents are the only solvents with the potential to damage the MTPs, therefore, the performance of embedded chips after exposure to these solvents will be directly evaluated. Applying a polypropylene or hybrid glass "patch" over the embedded MTPs is expected to provide more than sufficient stability against processing chemicals. However, the MTPs can be coated with protective polymers, such as parylene, and, if necessary, can be applied to the chips to further increase their chemical stability. Parylene, which has been uniformly applied as a 10 µm layer to the MTPs by gas vapor deposition (Kisco Conformal Coatings, Milford, Conn.), has strong chemical and solvent resistance [15] and can be applied in addition to or as an alternative to polypropylene.

Example 4

System Testing

The MTP tagged cassettes are incorporated into the workflow and receive the standard handwritten or printed label information and undergo processing using both automated and manual methods. Universal (standard) precautions are observed when handling any potentially biohazardous materials. The IDs are recorded before and after processing and matched to standard label. The number and the time to read each MTP are recorded and a visual inspection is performed to assess cassette integrity. Any defects or failures are noted. Hooks to integrate the SampleTrack software with database systems and plug-ins are created. The tester completes a survey of his/her experience with the tissue carriers, the ID reader and the software.

Filed concurrently herewith, and incorporated by reference for all methodologies applicable to the currently claimed invention, is an Application entitled "Tagging of Small Containers for Biological and Chemical Samples with Light-Activated Microtransponders,", Ser. No. 61/386,179, filed Sep. 24, 2010. Appendix I attached hereto shows the specifications of an illustrative system.

REFERENCES

1. Eiseman E, Haga S B 1999 Handbook of Human Tissue Sources, A National Resource of Human Tissue Samples, RAND
2. Eiseman E, Bloom G, Brower J, Clancy N, Olmsted S, Case Studies of Existing Human Tissue Repositories "Best Practices" for a Biospecimen Resource for the Genomic and Proteomic Era http://prostatenbnpilot.nci.nih.gov/docs/03RAND.pdf
3. 42 Code of Federal Regulations 493.1105— Standard: Retention Requirements. 2009. http://frwebgate6.access.gpo.gov/cgi-bin/TEXTgate.cgi?WAISdocID=869289242035+94+1+0&WAISaction=retrieve
4. http://www.tagsysrfid.com
5. http://www.magellan-technology.com
6. Mandecki W, Ardelt B, Coradetti T, Davidowitz H, Flint J, Huang Z, Kopacka W, Lin X, Wang Z, and Darzynkiewicz Z. 2006. Microtransponders, the miniature RFID electronic chips, as platforms for cell growth in cytotoxicity assays. Cytometry Part A 69A:1097-1105.
7. Lin X, Flint J, Azaro M, Coradetti T, Kopacka W, Streck D, Wang Z, Dermody J, and Mandecki W. 2007. Microtransponder-based multiplex assay for genotyping cystic fibrosis. Clin Chem 53:1372-1376.
8. Robinson E J H, Thomas O, Richardson T O, Sendova-Franks A B, Feinerman O, and Franks N R. 2009. Radio tagging reveals the roles of corpulence, experience and social information in ant decision making. Behav Ecol Sociobiol, 63(5) 627-636.
9. http://pharmaseq.com/rfid.html
10. Gruda M C, Pinto A, Craelius A, Davidowitz H, Kopacka W, Li J, Qian J, Rodriguez E, Kuspiel E and Mandecki W. (2010) A system for tagging laboratory mice with light-activated microtransponders (submitted for publication).
11. RFQ-NCI-100019-AS, http://rcb.cancer.gov/rcb-internet/appl/rfp/RFQ-NCI-100019-AS/RFQ-NCI-100019-AS.pdf
12. http://brnsymposium.com/meeting/brnsymposium/2009/docs/t/Compton%20C C.pdf
13. NCI's Best Practices for Biospecimen Resources. 2007. http://biospecimens.cancer.gov/global/pdfs/NCI_Best_Practices_060507.pdf
14. 14. The International Breast Cancer Study Group IBCSG Tissue Bank Policy http://www.ibcsg.org/Public/Tissue_Bank/Documents/IBCSG_Tissue_Bank_Policy_E nglish.pdf
15. http://www.kiscoparylene.com/what_is_parylene/parylene_properties
16. Luna L G, Histopathologic methods and molor atlas of special stains and tissue artifacts, 1992. Chapter 1. American Histolabs, Inc., Publications Division
17. A. B. Wojcik, K. Schuster, J. Kobelke, C Chojetzki, C. Michels, K. Rose and M. J. Matthewson, 2005. Novel glass protective coatings for high temperature applications. Proceedings of 54th International Wire & Cable Symposium, 368.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

While the foregoing is directed to embodiments of the present invention, other and further embodiments of the invention may be devised without departing from the basic scope thereof, and the scope thereof is determined by the claims that follow. Any claim below that is written as dependent on an independent claim can also be written as dependent on any of the claims under such independent claim, except where logic forecloses such a dependency.

What is claimed is:

1. An assembly comprising:
    a tissue cassette (a) configured to (i) retain therein a tissue specimen, (ii) have slots to allow externally applied reagents to act on the tissue specimen retained within the tissue cassette, and (iii) facilitate removal of the tissue specimen after chemical processing and (b) having plastic side walls;
    a light-triggered, compact transponder chip embedded within one of the side walls and oriented to be triggered from the side of the tissue cassette; and
    a slotted form factor configured to align the tissue cassette so that a laser triggering signal aligns with the transponder as the cassette is slid in the slot,
    wherein for a said transponder chip the tissue cassette has at most only any embedding cavity as structure that is specifically adapted to receive said transponder, wherein the MTP is embedded by heating it to a temperature above the melting point for the plastic and sinking it into the plastic, and wherein the embedding of the transponder chip preserves the structural integrity of the tissue cassette.

2. The assembly of claim 1, wherein the embedded transponder chip is covered with and sealed by polymer that is a transparent or semi-transparent material such that the compact transponder chip can be triggered therethrough.

3. The assembly of claim 1, wherein the tissue cassette is substantially box-shaped except that the short side on which the transponder chip is embedded is angled to form a wedge shape.

4. The assembly of claim 1, wherein the light-triggered, compact transponder chip has a length and a width, both of which are 0.7 mm or less.

5. The assembly of claim 1, wherein the light-triggered, compact transponder chip has a length and a width, both of which are 0.6 mm or less.

6. A method of use of the assembly of claim 1, wherein:
    (a) the assembly is physically linked to a tissue sample by placing the sample in the cassette; and
    (b) the ID of the transponder is read.

7. The method of claim 6, wherein the tissue in the cassette is processed to dry the tissue and then with a clearing agent prior to the ID being read.

8. The method of claim 6, wherein the cassette is at a temperature of −20° C. or less when it is read.

9. An assembly comprising
    a glass slide, having sides and a thickness, the slide adapted for viewing tissue samples;
    a light-triggered, compact transponder chip with photocell circuitry formed on a face of the transponder chip, wherein the transponder chip is (a) embedded in an embedding cavity located on a said side of the glass slide or (b) affixed on a said side, and oriented to be triggered from the side of the glass slide, wherein the plane of the photocell face is approximately perpendicular to the plane of the glass slide such that the transponder is aligned to be read from the side of the glass slide, wherein the glass slide is rectangular with two sides shorter than the other two; and
    a slotted form factor configured to align the slide so that a laser triggering signal aligns with the transponder chip as the short side of the slide is slid in the slot,
    wherein for a said transponder chip the glass slide has at most only any embedding cavity as structure that is specifically adapted to receive said transponder chip, wherein the transponder chip is embedded in or affixed on a said short side of the slide, and wherein the transponder chip is located within the thickness of the glass slide.

10. The assembly of claim 9, wherein the embedded transponder chip is covered with and sealed by polymer or inorganic-organic hybrid glass material.

11. The assembly of claim 10, wherein the transponder chip is covered with a transparent or semi-transparent material.

12. The assembly of claim 9, wherein the light-triggered, compact transponder chip has a length and a width, both of which are 0.7 mm or less.

13. The assembly of claim 9, wherein the light-triggered, compact transponder chip has a length and a width, both of which are 0.6 mm or less.

14. The assembly of claim 9, wherein the transponder chip is embedded in a said short side of the slide.

15. A method of use of the assembly of claim 9 according to which:
   (a) the assembly is physically linked to a sample by placing the sample on the glass slide and covering it with the cover slip or other protective material or substance; and
   (b) the ID of the transponder is read by directing at it the radiation emitted by a electronic reader capable of processing the signal sent by the transponder.

* * * * *